Oct. 27, 1925.
G. N. LIBBY
1,558,901
PROCESS OF MAKING ALKALI METAL CARBONATE
Filed May 25, 1922
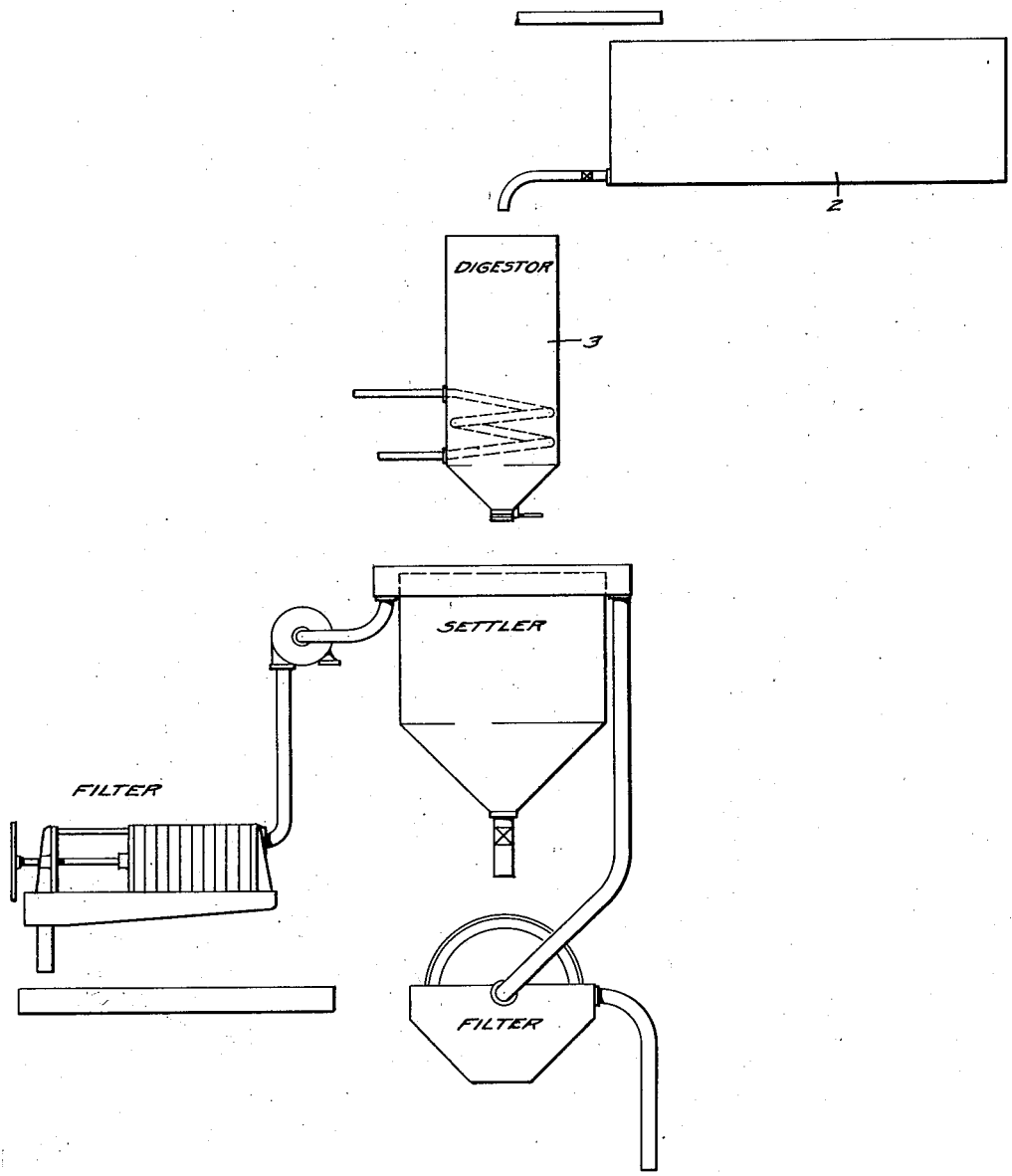
INVENTOR.
George N. Libby
BY White Frost Evans
his ATTORNEYS.
WITNESS
Bernard H. Doolin Patented Oct. 27, 1925.

1,558,901

UNITED STATES PATENT OFFICE.

GEORGE NELSON LIBBY, OF REDWOOD CITY, CALIFORNIA, ASSIGNOR TO NATIONAL MAGNESIA MANUFACTURING COMPANY, OF SAN FRANCISCO, CALIFORNIA, A CORPORATION OF CALIFORNIA.

PROCESS OF MAKING ALKALI-METAL CARBONATE.

Application filed May 25, 1922. Serial No. 563,705.

*To all whom it may concern:*

Be it known that I, GEORGE NELSON LIBBY, a citizen of the United States, and a resident of Redwood City, county of San Mateo, State of California, have invented a certain new and useful Process of Making Alkali-Metal Carbonate, of which the following is a specification.

The invention relates to a process of making normal alkali-metal carbonate.

An object of the invention is to provide a process of making normal alkali-metal carbonate, such as $Na_2CO_3$ from alkali-metal bi-carbonate, such as trona ($Na_2CO_3.NaHCO_3.2H_2O$), by treatment of the trona solution with an alkaline earth oxide or hydroxide, such as magnesium oxide.

Another object of the invention is to provide a process of manufacturing sodium carbonate from trona.

Another object of the invention is to provide a process of manufacturing sodium carbonate from trona which results in the production of a valuable by-product.

The invention possesses other advantageous features, some of which, with the foregoing, will be set forth at length in the following description, where I shall outline in full, one form of the process of my invention.

The drawing is a flow sheet illustrating the steps of the process.

In the following description I shall describe the process as applied to trona, but it is to be understood that it is applicable to other alkali-metal bi-carbonates.

In California, trona ($Na_2CO_3.NaHCO_3.2H_2O$) is a relatively cheap material and I have produced a process whereby it can be profitably manufactured into a material of greater value.

In carrying out my process I dissolve the trona in water to make a saturated trona solution at 100° Fahrenheit. This may be done by maintaining a saturated solution in storage at 100° Fahrenheit, but since the first step of the process involves heating a mixture including the trona solution, I prefer to make a saturated solution at ordinary atmospheric temperature and add sufficient trona to the solution in the first step of the process to produce a state of saturation at 100° Fahrenheit.

The saturated trona solution at ordinary temperature is stored in a tank 2, whence it is discharged, as desired, into the digester 3, which is heated to about 160° Fahrenheit, by suitable means, such as a steam coil. Sufficient crushed trona is added to the solution in the digester to produce a saturated solution at 100° Fahrenheit. This amount is usually about equal to half the weight of the trona in the solution taken from the storage tank. To the saturated trona solution in the digester, I add finely divided magnesium oxide, preferably in the form of ground calcined magnesite. The amount of magnesium oxide added is substantially equal to one-tenth of the weight of the trona in the saturated solution in the digester. The mixture is heated in the digester at a sufficient temperature and for sufficient time to accomplish the desired reaction. At a temperature of 160° Fahrenheit the mixture should be heated for about two hours and for lower temperatures a longer time is required. The reaction produces sodium carbonate and heavy magnesium carbonate in accordance with the following equation:

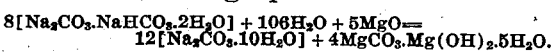
$8[Na_2CO_3.NaHCO_3.2H_2O] + 106H_2O + 5MgO =$
$12[Na_2CO_3.10H_2O] + 4MgCO_3.Mg(OH)_2.5H_2O.$ The resultant mass is discharged into a settling tank wherein the insoluble heavy magnesium carbonate settles and from which the supernatant sodium carbonate solution is withdrawn and passed through a filter and crystallized in evaporating pans.

The heavy magnesium carbonate is discharged from the settling tank and filtered, the liquid filtrate being added to the sodium carbonate solution passing to the filter.

I claim:

1. The process of making sodium carbonate which comprises adding magnesium oxide to a solution of trona saturated at 100° F.

2. The process of making sodium carbonate which comprises adding finely divided magnesium oxide to a saturated solution of trona.

3. The process of making sodium carbonate which comprises adding finely divided alkaline earth to a saturated solution of trona, whereby sodium carbonate solution and insoluble alkaline earth-metal carbonate is formed, separating the solution from the insoluble material and evaporating the solution.

4. The process of making sodium carbonate which comprises heating a mixture of trona solution saturated at 100° F. and magnesium oxide.

5. The process of making sodium carbonate which comprises heating a mixture of saturated trona solution and finely divided magnesium oxide and separating the resultant sodium carbonate solution.

6. The process of making sodium carbonate which comprises mixing ground calcined magnesite with a saturated trona solution and separating and evaporating the resultant liquor.

7. The process of making sodium carbonate which comprises heating a mixture of ground calcined magnesite and a saturated trona solution to form sodium carbonate solution, and separating and evaporating the sodium carbonate solution.

8. The process of making normal sodium carbonate and heavy magnesium carbonate which comprises heating a mixture of saturated trona solution and finely divided calcined magnesite in an open vessel whereby normal sodium carbonate and heavy magnesium carbonate are formed and separating the sodium carbonate solution from the insoluble heavy magnesium carbonate.

In testimony whereof, I have hereunto set my hand.

GEORGE NELSON LIBBY.